United States Patent
Pan et al.

(10) Patent No.: US 10,219,251 B2
(45) Date of Patent: Feb. 26, 2019

(54) METHOD AND DEVICE FOR COMMUNICATION

(71) Applicant: CHINA ACADEMY OF TELECOMMUNICATIONS TECHNOLOGY, Beijing (CN)

(72) Inventors: Xueming Pan, Beijing (CN); Zukang Shen, Beijing (CN); Jing Xu, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 288 days.

(21) Appl. No.: 14/780,574

(22) PCT Filed: Mar. 31, 2014

(86) PCT No.: PCT/CN2014/074393
§ 371 (c)(1),
(2) Date: Sep. 28, 2015

(87) PCT Pub. No.: WO2014/161453
PCT Pub. Date: Oct. 9, 2014

(65) Prior Publication Data
US 2016/0057744 A1    Feb. 25, 2016

(30) Foreign Application Priority Data
Apr. 1, 2013 (CN) .......................... 2013 1 0111461

(51) Int. Cl.
*H04L 12/28*  (2006.01)
*H04W 72/04*  (2009.01)
(Continued)

(52) U.S. Cl.
CPC ....... *H04W 72/0406* (2013.01); *H04L 1/1812* (2013.01); *H04L 1/1864* (2013.01);
(Continued)

(58) Field of Classification Search
CPC .................................................. H04W 72/0406
(Continued)

(56) References Cited

U.S. PATENT DOCUMENTS

2013/0044652 A1* 2/2013 Wang ................. H04L 1/08
370/280
2013/0223298 A1 8/2013 Ahn et al.
2016/0309461 A1* 10/2016 Yin ................... H04W 72/0413

FOREIGN PATENT DOCUMENTS

CN         102064879 A    5/2011
CN         102231643 A    10/2011
(Continued)

OTHER PUBLICATIONS

First Office Action regarding Chinese Application No. 201310111461.1, dated Dec. 5, 2016. Translation provided by EPO.
International Search Report and Written Opinion of the International Searching Authority for International Application No. PCT/CN2014/074393, dated Jul. 4, 2014. Translation provided by WIPO.
(Continued)

*Primary Examiner* — Dang Ton
(74) *Attorney, Agent, or Firm* — Pro-TECHTOR International Services; Ian Oglesby (57) ABSTRACT

The present disclosure discloses a method and a device for communication. The method includes: determining, by the user equipment, a specific uplink-downlink sub-frame configuration when the uplink-downlink sub-frame configuration information is not received by the user equipment during the period; and communicating with a network side equipment by the user equipment during the period based on the specific uplink-downlink sub-frame configuration. By the solution of the present disclosure, a probability of the situation that the user equipment cannot communicate with the network normally as the user equipment does not correctly receive the physical layer control signaling which carries the uplink-downlink sub-frame configuration information and is sent from the network side is reduced, and user throughput is improved.

6 Claims, 2 Drawing Sheets

(51) Int. Cl.
  *H04W 48/10* (2009.01)
  *H04L 1/18* (2006.01)
  *H04L 5/00* (2006.01)
  *H04L 5/14* (2006.01)

(52) U.S. Cl.
  CPC .......... *H04L 1/1896* (2013.01); *H04L 5/0096* (2013.01); *H04L 5/1469* (2013.01); *H04W 48/10* (2013.01); *H04W 72/0446* (2013.01)

(58) Field of Classification Search
  USPC ........................................................ 370/329
  See application file for complete search history.

(56) References Cited

FOREIGN PATENT DOCUMENTS

| | | | |
|---|---|---|---|
| CN | 102594533 A | | 7/2012 |
| CN | WO2013/004127 A1 | * | 1/2013 |
| CN | WO2013/113272 A1 | * | 8/2013 |
| CN | 103516498 A | | 1/2014 |
| WO | WO2012134107 A2 | | 10/2012 |

OTHER PUBLICATIONS

EPO Supplementary Search Report and Opinion for EPO application No. 14779462.2 dated Feb. 22, 2016.
Office action from Korean Patent Application No. 10-2015-7030355 dated Feb. 17, 2017, and its English translation.
Office action from Japanese Patent Application No. 2016-505692 dated Sep. 1, 2016, and its English translation.
Office action from Japanese Patent Application No. 2016-505692 dated Jan. 23, 2017, and its English translation.
CATT, "Signalling mechanisms for TDD UL-DL reconfigurations" 3GPP TSG RAN WG1 Meeting #72, R1-130052. Jan. 28-Feb. 1, 2013, St. Julian's, Malta.
Nokia Corporation, Nokia Siemens Networks,"Discussion on Methods to support different time scales for TDD UL-DL reconfiguration" 3GPP TSG-RAN WG1 Meeting #69, R1-122435, May 21-25, 2012, Prague, Czech Republic.
ZTE,"HARQ timing in TDD-eIMTA" 3GPP TSG RAN WG1 Meeting #72, R1-130130, Jan. 28-Feb. 1, 2013, St Julian's, Malta.
Second Office Action regarding Chinese Application No. 201310111461.1. Translation provided by EPO.

* cited by examiner

METHOD AND DEVICE FOR COMMUNICATION

CROSS-REFERENCE TO RELATED APPLICATION

This application is the U.S. national phase of PCT Application No. PCT/CN2014/074393 filed on Mar. 31, 2014, which claims a priority to Chinese Patent Application No. 201310111461.1 filed on Apr. 1, 2013 and titled "METHOD AND DEVICE FOR COMMUNICATION", the disclosures of which are incorporated in their entireties by reference herein.

TECHNICAL FIELD

The present disclosure relates to the field of wireless communication technology, and in particular to a method and a device for communication.

BACKGROUND

Figure 1:
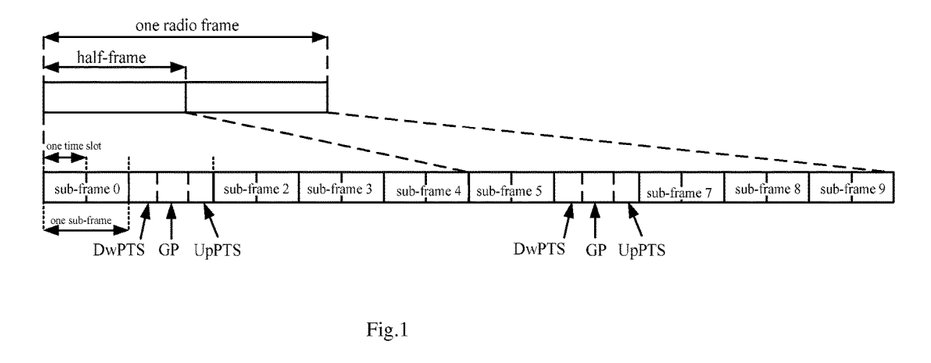
FIG. 1 is a schematic view showing a frame structure of a TD-LTE system according to the related art.

The time division duplex (TDD) mode, as one of the two basic duplex systems, has got more and more attention under a constant growth of the demand for the bandwidth of broadband mobile communication. Uplink and downlink transmissions in the TDD system use the same frequency resource, and uplink and downlink signals are transmitted in different time slots. In a common TDD system such as 3rd Generation (3G) Time Division Synchronized Code Division Multiple Access (TD-SCDMA) system and 4th Generation (4G) TD-SCDMA Long Term Evolution (TD-LTE) system, division of uplink and downlink time slots is static or semi-static. Generally, the division ratio of uplink and downlink time slots may be determined based on a cell type and a rough service scale in a network planning and may remain unchanged. That is easy and effective in the context of large coverage of macro-cell. FIG. 1 shows a frame structure of the TDD mode specified in the 3rd Generation Partnership Project (3GPP) LTE (Version) Rel-8/9/10. The supported uplink and downlink sub-frame configurations include the seven ways shown in Table 1.

One radio frame has a length of 10 ms, including 10 sub-frames classified as special sub-frames and normal sub-frames, the length of each sub-frame is 1 ms. The special sub-frame includes three sub-frames: a Downlink Pilot Time Slot (DwPTS), a Guard Period (GP) between an uplink frame and a downlink frame, an Uplink Pilot Time Slot (UpPTS). The normal sub-frame includes an uplink sub-frame and a downlink sub-frame configured to transmit uplink/downlink control channels and service, etc. One radio frame may be configured with two special sub-frames (in sub-frames 1 and 6) or with one special sub-frame (in sub-frame 1). The sub-frames 0 and 5 and the DwPTS sub-frame of the special sub-frame are always reserved for downlink transmission, the sub-frame 2 and the UpPTS sub-frame of the special sub-frame are always reserved for uplink transmission, and other sub-frames may be configured for uplink transmission or downlink transmission as needed.

TABLE 1

| config-uration number | length of one sub-frame | sub-frame number ||||||||||
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

With the development of the network, 3GPP TR36.828 and some of 3GPP conferences publish several designing schemes of signaling, to support a flexible uplink-downlink (UL-DL) sub-frame configuration in a TDD cell. One of the schemes is that a base station sends information indicating a TDD uplink-downlink sub-frame configuration to a user equipment via a physical layer control channel or signal, to notify the user equipment current uplink-downlink sub-frame configuration information of a cell. The physical layer control channel herein may adopt a physical channel such as specific DCI (Downlink Control Information) format of a physical downlink control channel (PDCCH) or a physical broadcast channel (PBCH).

The present physical layer control channel such as PDCCH and PBCH does not have a hybrid automatic repeat request (HARQ) mechanism. The user equipment may not learn an uplink-downlink sub-frame configuration in a current radio frame if the user equipment does not demodulate correctly a physical layer control signaling carrying uplink-downlink sub-frame configuration information, thereby a sub-frame for blind-detecting the PDCCH or an enhance PDCCH and an uplink-downlink HARQ timing may not be determined. At this point, the user equipment cannot communicate with the network normally during the uplink-downlink sub-frame reconfiguration period, thereby causing a significant drop of user throughput.

To sum up, at present, the user equipment cannot communicate with the network normally if the user equipment does not receive correctly the physical layer control signaling carrying uplink-downlink sub-frame configuration information sent from the network side, thereby causing a significant drop of user throughput.

SUMMARY

The present disclosure provides a method and a device for communication, to solve the problems existing in the related art that a user equipment cannot communicate with a network normally if the user equipment does not receive correctly a physical layer control signaling carrying uplink-downlink sub-frame configuration information sent from the network side, thus causing a significant drop of user throughput.

A method for communication is provided in one embodiment of the present disclosure, including:

receiving, by a user equipment, uplink-downlink sub-frame configuration information sent by a network side equipment, during a current uplink-downlink sub-frame reconfiguration period;

determining, by the user equipment, a specific uplink-downlink sub-frame configuration when the uplink-downlink sub-frame configuration information is not received by the user equipment during the current uplink-downlink sub-frame reconfiguration period; and communicating with the network side equipment by the user equipment during the current uplink-downlink sub-frame reconfiguration period, based on the specific uplink-downlink sub-frame configuration.

Optionally, the determining, by the user equipment, a specific uplink-downlink sub-frame configuration includes:

determining, by the user equipment, an uplink-downlink sub-frame configuration corresponding to last uplink-downlink sub-frame configuration information received successfully by the user equipment as the specific uplink-downlink sub-frame configuration; or selecting, by the user equipment, an uplink-downlink sub-frame configuration with the most downlink sub-frames or uplink sub-frames from all alternative uplink-downlink sub-frame configurations as the specific uplink-downlink sub-frame configuration; or determining, by the user equipment, the specific uplink-downlink sub-frame configuration based on previously received specific uplink-downlink sub-frame configuration information sent by the network side equipment via a high-layer signaling; or determining, by the user equipment, an uplink-downlink sub-frame configuration corresponding to previously received uplink-downlink sub-frame configuration information sent by the network side equipment via system broadcasting as the specific uplink-downlink sub-frame configuration; or determining, by the user equipment, a reference uplink-downlink sub-frame configuration configured to determine a DL HARQ timing or a UL HARQ timing as the specific uplink-downlink sub-frame configuration; or selecting, by the user equipment, an uplink-downlink configuration from uplink-downlink configurations specified in the 3GPP TS36.211 as the specific uplink-downlink sub-frame configuration.

Optionally, the user equipment selects an uplink-downlink configuration 2 or an uplink-downlink configuration 5 from the uplink-downlink configurations specified in the 3GPP TS36.211 as the specific uplink-downlink sub-frame configuration.

Optionally, the user equipment selects an uplink-downlink configuration 0 from the uplink-downlink configurations specified in the 3GPP TS36.211 as the specific uplink-downlink sub-frame configuration.

Optionally, the communicating with the network side equipment by the user equipment during the current uplink-downlink sub-frame reconfiguration period includes a part or all of the following:

communicating with the network side equipment by the user equipment during the current uplink-downlink sub-frame reconfiguration period based on the specific uplink-downlink sub-frame configuration in a manner that the specific uplink-downlink sub-frame configuration is configured to determine an uplink sub-frame and/or a downlink sub-frame during the current uplink-downlink sub-frame reconfiguration period;

communicating with the network side equipment by the user equipment during the current uplink-downlink sub-frame reconfiguration period based on the specific uplink-downlink sub-frame configuration in a manner that the specific uplink-downlink sub-frame configuration is configured to determine a sub-frame for blind-detecting a PDCCH and/or an E-PDCCH;

communicating with the network side equipment by the user equipment during the current uplink-downlink sub-frame reconfiguration period based on the specific uplink-downlink sub-frame configuration in a manner that the specific uplink-downlink sub-frame configuration is configured to determine the DL HARQ timing;

communicating with the network side equipment by the user equipment during the current uplink-downlink sub-frame reconfiguration period based on the specific uplink-downlink sub-frame configuration in a manner that the specific uplink-downlink sub-frame configuration is configured to determine an uplink physical uplink shared channel (PUSCH) scheduling timing and an uplink HARQ timing.

A user equipment for communication is provided in one embodiment of the present disclosure, including:

a receiving module, configured to receive uplink-downlink sub-frame configuration information sent by a network side equipment during a current uplink-downlink sub-frame reconfiguration period;

a determination module, configured to determine a specific uplink-downlink sub-frame configuration when the uplink-downlink sub-frame configuration information is not received during the current uplink-downlink sub-frame reconfiguration period;

a communication module, configured to communicate with the network side equipment during the current uplink-downlink sub-frame reconfiguration period based on the specific uplink-downlink sub-frame configuration.

Optionally, the determination module is configured to, determine an uplink-downlink sub-frame configuration corresponding to last uplink-downlink sub-frame configuration information received successfully as the specific uplink-downlink sub-frame configuration; or select an uplink-downlink sub-frame configuration with the most downlink sub-frames or uplink sub-frames from all alternative uplink-downlink sub-frame configurations as the specific uplink-downlink sub-frame configuration; or determine the specific uplink-downlink sub-frame configuration based on previously received specific uplink-downlink sub-frame configuration information sent by the network side equipment via a high-layer signaling; or determine an uplink-downlink sub-frame configuration corresponding to previously received uplink-downlink sub-frame configuration information sent by the network side equipment via system broadcasting as the specific uplink-downlink sub-frame configuration; or determine a reference uplink-downlink sub-frame configuration configured to determine a DL HARQ timing or a UL HARQ timing as the specific uplink-downlink sub-frame configuration; or select an uplink-downlink configuration from uplink-downlink configurations specified in the 3GPP TS36.211 as the specific uplink-downlink sub-frame configuration.

Optionally, the determination module is further configured to select an uplink-downlink configuration 2 or an uplink-downlink configuration 5 from the uplink-downlink configurations specified in the 3GPP TS36.211 when selecting one uplink-downlink configuration from the uplink-downlink configurations specified in the 3GPP TS36.211 as the specific uplink-downlink sub-frame configuration.

Optionally, the determination module is further configured to select an uplink-downlink configuration 0 from the uplink-downlink configurations specified in the 3GPP TS36.211 when selecting one uplink-downlink configuration from the uplink-downlink configurations specified in the 3GPP TS36.211 as the specific uplink-downlink sub-frame configuration.

Optionally, the communication module is configured to communicate with the network side equipment during the current uplink-downlink sub-frame reconfiguration period in a manner which includes a part or all of the following:

communicating with the network side equipment during the current uplink-downlink sub-frame reconfiguration period based on the specific uplink-downlink sub-frame configuration in a manner that the specific uplink-downlink sub-frame configuration is configured to determine an uplink sub-frame and/or a downlink sub-frame during the current uplink-downlink sub-frame reconfiguration period;

communicating with the network side equipment during the current uplink-downlink sub-frame reconfiguration period based on the specific uplink-downlink sub-frame configuration in a manner that the specific uplink-downlink sub-frame configuration is configured to determine a sub-frame for blind-detecting a PDCCH and/or an E-PDCCH;

communicating with the network side equipment during the current uplink-downlink sub-frame reconfiguration period based on the specific uplink-downlink sub-frame configuration in a manner that the specific uplink-downlink sub-frame configuration is configured to determine the DL HARQ timing;

communicating with the network side equipment during the current uplink-downlink sub-frame reconfiguration period based on the specific uplink-downlink sub-frame configuration in a manner that the specific uplink-downlink sub-frame configuration is configured to determine an uplink PUSCH scheduling timing and an uplink HARQ timing.

Another user equipment is further provided in one embodiment of the present disclosure, including a processor and a data transceiver, wherein the processor is configured to receive uplink-downlink sub-frame configuration information sent by a network side equipment during a current uplink-downlink sub-frame reconfiguration period; determine a specific uplink-downlink sub-frame configuration when the uplink-downlink sub-frame configuration information is not received during the current uplink-downlink sub-frame reconfiguration period; and communicate with the network side equipment during the current uplink-downlink sub-frame reconfiguration period based on the specific uplink-downlink sub-frame configuration;

the data transceiver is configured to implement a data transmission between the processor and the network side equipment.

According to the embodiment of the present disclosure, the user equipment communicates with the network side equipment during a current uplink-downlink sub-frame reconfiguration period based on a specific uplink-downlink sub-frame configuration when uplink-downlink sub-frame configuration information sent by the network side equipment is not received by the user equipment during the period. Thus, the probability of the situation that the user equipment cannot communicate with a network normally as the user equipment does not correctly receive a physical layer control signaling carrying the uplink-downlink sub-frame configuration information sent from the network side is reduced, thereby improving user throughput.

DETAILED DESCRIPTION

According to one embodiment of the present disclosure, after a user equipment fails to receive uplink-downlink sub-frame configuration information sent by a network side equipment during a current uplink-downlink sub-frame reconfiguration period, the user equipment communicates with the network side equipment during the current uplink-downlink sub-frame reconfiguration period according to a specific uplink-downlink sub-frame configuration. Thus, the probability of a situation that the user equipment cannot communicate with the network normally as the user equipment does not correctly receive a physical layer control signaling which carries the uplink-downlink sub-frame configuration information and is sent from the network side is reduced, thereby improving user throughput.

Figure 2:
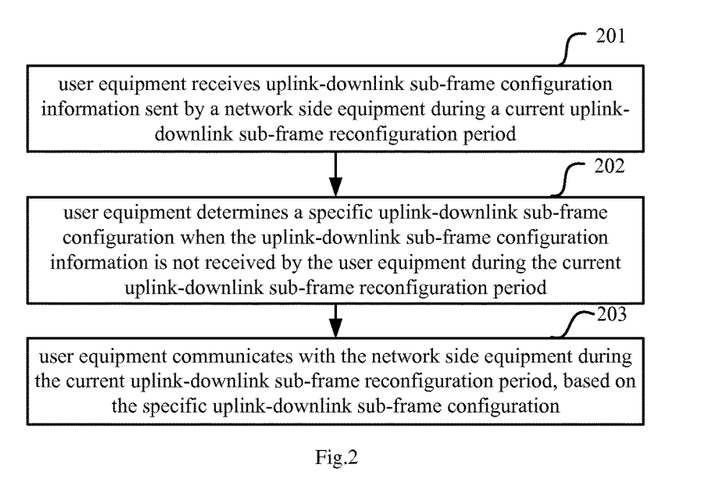
FIG. 2 is a flow chart of a method for communication according to one embodiment of the present disclosure.

As shown in FIG. 2, a method for communication according to one embodiment of the present disclosure includes:

Step 201: receiving, by a user equipment, uplink-downlink sub-frame configuration information sent by a network side equipment in a current uplink-downlink sub-frame reconfiguration period;

Step 202: determining, by the user equipment, a specific uplink-downlink sub-frame configuration after the user equipment does not receive the uplink-downlink sub-frame configuration information in the current uplink-downlink sub-frame reconfiguration period; and Step 203: communicating, by the user equipment, with the network side equipment in the current uplink-downlink sub-frame reconfiguration period, according to the specific uplink-downlink sub-frame configuration.

Optionally, the user equipment may select one of the following uplink-downlink sub-frame configurations as the specific uplink-downlink sub-frame configuration:

an uplink-downlink sub-frame configuration corresponding to last uplink-downlink sub-frame configuration information received successfully by the user equipment; or an uplink-downlink sub-frame configuration with the most downlink sub-frames or uplink sub-frames selected by the user equipment from all the alternative uplink-downlink sub-frame configurations; or a specific uplink-downlink sub-frame configuration determined by the user equipment according to previously received specific uplink-downlink sub-frame configuration information sent by the network side equipment via a high-layer signaling, wherein the network side notifies in advance the user equipment of specific uplink-downlink sub-frame configuration information before the user equipment determines the specific uplink-downlink sub-frame configuration; or an uplink-downlink sub-frame configuration determined by the user equipment corresponding to previously received uplink-downlink sub-frame configuration information sent by the network side equipment via system broadcasting; or a reference uplink-downlink sub-frame configuration configured to determine a downlink hybrid automatic repeat request (DL HARQ) timing or an uplink hybrid (UL HARQ) timing, wherein the user equipment may be notified of the reference uplink-downlink sub-frame configuration configured to determine the DL HARQ timing or the UL HARQ timing by the network side through a signaling or in a manner set in protocols; or an uplink-downlink configuration selected by the user equipment from uplink-downlink configurations specified in the 3GPP TS36.211.

Optionally, the user equipment selects an uplink-downlink configuration 2 or an uplink-downlink configuration 5 from the uplink-downlink configurations specified in the 3GPP TS36.211, i.e., the uplink-downlink configuration 2 or the uplink-downlink configuration 5 in the table 1.

Optionally, the user equipment selects an uplink-downlink configuration 0 from the uplink-downlink configurations specified in the 3GPP TS36.211, i.e., the uplink-downlink configuration 0 in the table 1.

Optionally, the user equipment communicates with the network side equipment during the current uplink-downlink sub-frame reconfiguration period in a manner which includes a part or all of the following:

communicating with the network side equipment by the user equipment during the current uplink-downlink sub-frame reconfiguration period based on the specific uplink-downlink sub-frame configuration in a manner that the specific uplink-downlink sub-frame configuration is configured to determine an uplink sub-frame and/or a downlink sub-frame during the current uplink-downlink sub-frame reconfiguration period, i.e., the uplink sub-frame and/or the downlink sub-frame during the current uplink-downlink sub-frame reconfiguration period is determined based on the specific uplink-downlink sub-frame configuration, and the user equipment communicates with the network side equipment during the current uplink-downlink sub-frame reconfiguration period based on the determined uplink sub-frame and/or the downlink sub-frame;

communicating with the network side equipment by the user equipment during the current uplink-downlink sub-frame reconfiguration period based on the specific uplink-downlink sub-frame configuration in a manner that the specific uplink-downlink sub-frame configuration is configured to determine a sub-frame for blind-detecting a PDCCH and/or an E-PDCCH, i.e., the sub-frame for blind-detecting the PDCCH and/or the E-PDCCH is determined based on the specific uplink-downlink sub-frame configuration;

communicating with the network side equipment by the user equipment during the current uplink-downlink sub-frame reconfiguration period based on the specific uplink-downlink sub-frame configuration in a manner that the specific uplink-downlink sub-frame configuration is configured to determine the DL HARQ timing, i.e., the HARQ timing of downlink data PDSCH is determined based on the specific uplink-downlink sub-frame configuration;

communicating with the network side equipment by the user equipment during the current uplink-downlink sub-frame reconfiguration period based on the specific uplink-downlink sub-frame configuration in a manner that the specific uplink-downlink sub-frame configuration is configured to determine an uplink PUSCH scheduling timing and an uplink HARQ timing, i.e., the uplink PUSCH scheduling timing and the uplink PUSCH HARQ timing are determined base on the specific uplink-downlink sub-frame configuration.

Based on the same concept, a user equipment is further provided in the present disclosure. The principle to solve problem of the user equipment is similar to that of the method for communication according to the embodiment of the present disclosure, so the implementation of the user equipment may refer to the implementation of the method for communication, and the description thereof is omitted herein.

Figure 3:
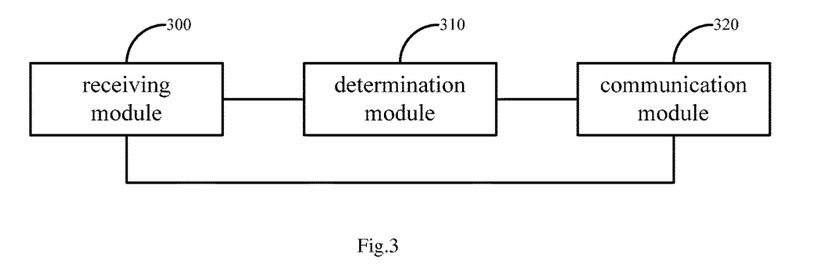
FIG. 3 is a schematic view showing a structure of a user equipment according to one embodiment of the disclosure.

As shown in FIG. 3, the user equipment according to the embodiment of the present disclosure includes: a receiving module 300, a determination module 310 and a communication module 320.

The receiving module 300 is configured to receive uplink-downlink sub-frame configuration information sent by a network side equipment during a current uplink-downlink sub-frame reconfiguration period.

The determination module 310 is configured to determine a specific uplink-downlink sub-frame configuration when the uplink-downlink sub-frame configuration information is not received during the current uplink-downlink sub-frame reconfiguration period.

The communication module 320 is configured to communicate with the network side equipment during the current uplink-downlink sub-frame reconfiguration period based on the specific uplink-downlink sub-frame configuration.

Optionally, the determination module 310 is specifically configured to:

determine an uplink-downlink sub-frame configuration corresponding to last uplink-downlink sub-frame configuration information received successfully as the specific uplink-downlink sub-frame configuration; or select an uplink-downlink sub-frame configuration with the most downlink sub-frames or uplink sub-frames from all the alternative uplink-downlink sub-frame configurations as the specific uplink-downlink sub-frame configuration; or determine the specific uplink-downlink sub-frame configuration based on previously received specific uplink-downlink sub-frame configuration information sent by the network side equipment via a high-layer signaling; or determine an uplink-downlink sub-frame configuration corresponding to previously received uplink-downlink sub-frame configuration information sent by the network side equipment via system broadcasting as the specific uplink-downlink sub-frame configuration; or determine a reference uplink-downlink sub-frame configuration configured to determine a DL HARQ timing or a UL HARQ timing as the specific uplink-downlink sub-frame configuration; or select an uplink-downlink configuration from uplink-downlink configurations specified in the 3GPP TS36.211 as the specific uplink-downlink sub-frame configuration.

Optionally, the determination module 310 is further configured to, when selecting one uplink-downlink configuration from the uplink-downlink configurations specified in the 3GPP TS36.211 as the specific uplink-downlink sub-frame configuration, select an uplink-downlink configuration 2 or an uplink-downlink configuration 5 from the uplink-downlink configurations specified in the 3GPP TS36.211.

Optionally, the determination module 310 is further configured to, when selecting one uplink-downlink configuration from the uplink-downlink configurations specified in the 3GPP TS36.211 as the specific uplink-downlink sub-frame configuration, select an uplink-downlink configuration 0 from the uplink-downlink configurations specified in the 3GPP TS36.211.

Optionally, the communication module 320 is configured to communicate with the network side equipment during the current uplink-downlink sub-frame reconfiguration period in a manner which includes a part or all of the following:

communicating with the network side equipment during the current uplink-downlink sub-frame reconfiguration period based on the specific uplink-downlink sub-frame configuration in a manner that the specific uplink-downlink sub-frame configuration is configured to determine an uplink sub-frame and/or a downlink sub-frame during the current uplink-downlink sub-frame reconfiguration period;

communicating with the network side equipment during the current uplink-downlink sub-frame reconfiguration period based on the specific uplink-downlink sub-frame configuration in a manner that the specific uplink-downlink sub-frame configuration is configured to determine a sub-frame for blind-detecting a PDCCH and/or an E-PDCCH;

communicating with the network side equipment during the current uplink-downlink sub-frame reconfiguration period based on the specific uplink-downlink sub-frame configuration in a manner that the specific uplink-downlink sub-frame configuration is configured to determine DL HARQ timing;

communicating with the network side equipment during the current uplink-downlink sub-frame reconfiguration period based on the specific uplink-downlink sub-frame configuration in a manner that the specific uplink-downlink sub-frame configuration is configured to determine an uplink PUSCH scheduling timing and an uplink HARQ timing.

Another user equipment is further provided in the embodiment of the present disclosure, including a processor and a data transceiver.

The processor is configured to receive uplink-downlink sub-frame configuration information sent by a network side equipment during a current uplink-downlink sub-frame reconfiguration period; determine a specific uplink-downlink sub-frame configuration when the uplink-downlink sub-frame configuration information is not received during the current uplink-downlink sub-frame reconfiguration period; and communicate with the network side equipment during the current uplink-downlink sub-frame reconfiguration period based on the specific uplink-downlink sub-frame configuration.

The data transceiver is configured to implement a data transmission between the processor and the network side equipment.

The technical solution of the present disclosure may be illustrated taking an example that the user equipment determines an uplink-downlink sub-frame configuration corresponding to last uplink-downlink sub-frame configuration information received successfully by the user equipment as the specific uplink-downlink sub-frame configuration.

Figure 4:
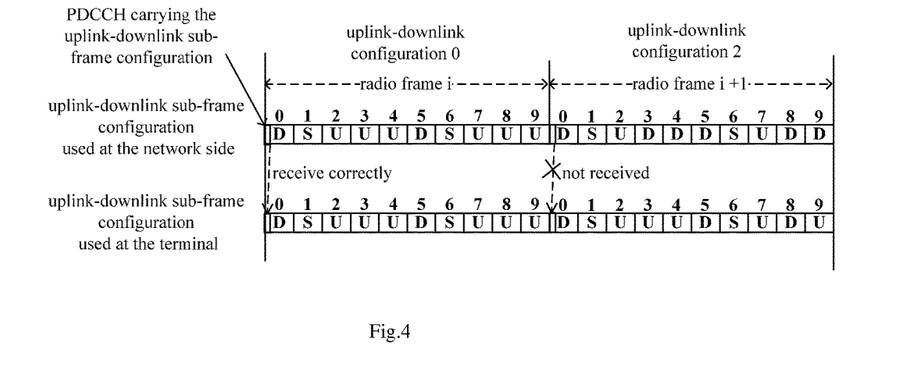
FIG. 4 is a schematic view of sending uplink-downlink sub-frame configuration information according to one embodiment of the disclosure.

As shown in FIG. 4, a base station sends a DCI carrying an uplink-downlink sub-frame configuration in a sub-frame 0 of each radio frame via a PDCCH, to notify the user equipment of an uplink-downlink sub-frame configuration of a cell in the radio frame.

The user equipment is notified of that an uplink-downlink configuration of the network is a configuration 0 through the sub-frame 0 of a radio frame i, and then the user equipment may communicate with the network in a manner defined by the configuration 0.

The uplink-downlink configuration is modified to a configuration 2 at the network side of a next radio frame i+1, and the PDCCH carrying the uplink-downlink sub-frame configuration sent from the network side is not received correctly by the user equipment in the sub-frame 0, then the user equipment still communicates with the network according to the configuration 0 of the previous radio frame i.

Those skilled in the art may understand that the present disclosure may be embodied by a method, a system or a computer program product. Therefore, the present disclosure may be embodied completely by hardware, software or by a combination of software and hardware. In addition, the present disclosure may be embodied by a computer program product implemented in one or more computer available storage medium including computer available program code (including but not limited to disk storage, CD-ROM, optical storage, etc.).

The present disclosure is described in conjunction with the flow chart and/or block diagram of the method, device (system) and computer program product according to the embodiments of the present disclosure. It should be understood that, each flow and/or block of the flow chart and/or block diagram or a combination of each flow and/or block of the flow chart and/or block diagram may be implemented by the computer program instructions. These computer program instructions may be provided to a general purpose computer, a dedicated computer, an embedded processor or the processors of other programmable data processing devices to make a machine, so as to make the instructions performed by the processor of the general-purpose computer or other programmable data processing device produces an apparatus for implementing the functions prescribed in one or more flows in the flow chart and/or one or more blocks in the block diagram.

These computer program instructions may further be stored in a computer readable storage capable of leading the computer or other programmable data processing device to work in a specific manner, such that the instructions stored in the computer readable storage medium may produce an article of manufacture including an instruction device, where the instruction device implements the functions prescribed in one or more flows in the flow chart and/or one or more blocks in the block diagram.

These computer program instructions may further be loaded into a computer or other programmable data processing device, such that a series of operation steps may be performed in the computer or other programmable device, so as to produce a computer-implemented processing, thereby the instructions performed in the computer or other programmable device may provide the steps of implementing the functions prescribed in one or more flows in the flow chart and/or one or more blocks in the block diagram.

Although the embodiments of the present disclosure have been described, those skilled in the art may make alterations or modifications to the embodiments after learning the basic inventive concept of the present disclosure. Therefore, the claims are meant to include the embodiments and the alterations and modifications falling into the scope of the present disclosure.

Obviously, those skilled in the art may make various alterations and modifications without departing from the spirit and scope of the present disclosure. In this case, if these alterations and modifications fall into the scope of the claims of the present disclosure and the equivalent technology thereof, the present disclosure may include these alterations and modifications.

What is claimed is:

1. A method for communication, comprising:
receiving, by a user equipment, uplink-downlink sub-frame configuration information sent by a network side equipment, during a current uplink-downlink sub-frame reconfiguration period;
determining, by the user equipment, a specific uplink-downlink sub-frame configuration when the uplink-downlink sub-frame configuration information is not received by the user equipment during the current uplink-downlink sub-frame reconfiguration period; and
communicating, by the user equipment, with the network side equipment during the current uplink-downlink sub-frame reconfiguration period, based on the specific uplink-downlink sub-frame configuration; wherein the determining, by the user equipment, the specific uplink-downlink sub-frame configuration comprises:
  determining, by the user equipment, an uplink-downlink sub-frame configuration corresponding to last uplink-downlink sub-frame configuration information received successfully by the user equipment as the specific uplink-downlink sub-frame configuration; or
  selecting, by the user equipment, an uplink-downlink sub-frame configuration with the most downlink sub-frames or uplink sub-frames from all alternative uplink-downlink sub-frame configurations as the specific uplink-downlink sub-frame configuration; or
  determining, by the user equipment, the specific uplink-downlink sub-frame configuration based on previously received specific uplink-downlink sub-frame configuration information sent by the network side equipment via a high-layer signaling; or
  determining, by the user equipment, an uplink-downlink sub-frame configuration corresponding to previously received uplink-downlink sub-frame configuration information sent by the network side equipment via system broadcasting as the specific uplink-downlink sub-frame configuration; or
  determining, by the user equipment, a reference uplink-downlink sub-frame configuration configured to determine a downlink hybrid automatic repeat request (DL HARQ) timing or an uplink hybrid automatic repeat request (UL HARQ) timing as the specific uplink-downlink sub-frame configuration.

2. The method according to claim 1, wherein the communicating, by the user equipment, with the network side equipment during the current uplink-downlink sub-frame reconfiguration period comprises a part or all of the following:
  communicating with the network side equipment by the user equipment during the current uplink-downlink sub-frame reconfiguration period based on the specific uplink-downlink sub-frame configuration in a manner that the specific uplink-downlink sub-frame configuration is configured to determine an uplink sub-frame and/or a downlink sub-frame during the current uplink-downlink sub-frame reconfiguration period;
  communicating with the network side equipment by the user equipment during the current uplink-downlink sub-frame reconfiguration period based on the specific uplink-downlink sub-frame configuration in a manner that the specific uplink-downlink sub-frame configuration is configured to determine a sub-frame for blind-detecting a physical downlink control channel (PDCCH) and/or an enhanced physical downlink control channel (E-PDCCH);
  communicating with the network side equipment by the user equipment during the current uplink-downlink sub-frame reconfiguration period based on the specific uplink-downlink sub-frame configuration in a manner that the specific uplink-downlink sub-frame configuration is configured to determine the downlink hybrid automatic repeat request timing;
  communicating with the network side equipment by the user equipment during the current uplink-downlink sub-frame reconfiguration period based on the specific uplink-downlink sub-frame configuration in a manner that the specific uplink-downlink sub-frame configuration is configured to determine an uplink physical uplink shared channel (PUSCH) scheduling timing and the uplink hybrid automatic repeat request timing.

3. A user equipment for communication, comprising:
  a receiving module, configured to receive uplink-downlink sub-frame configuration information sent by a network side equipment during a current uplink-downlink sub-frame reconfiguration period;
  a determination module, configured to determine a specific uplink-downlink sub-frame configuration when the uplink-downlink sub-frame configuration information is not received during the current uplink-downlink sub-frame reconfiguration period; and
  a communication module, configured to communicate with the network side equipment during the current uplink-downlink sub-frame reconfiguration period based on the specific uplink-downlink sub-frame configuration,
wherein the determination module is configured to,
  determine an uplink-downlink sub-frame configuration corresponding to last uplink-downlink sub-frame configuration information received successfully as the specific uplink-downlink sub-frame configuration; or
  select an uplink-downlink sub-frame configuration with the most downlink sub-frames or uplink sub-frames from all alternative uplink-downlink sub-frame configurations as the specific uplink-downlink sub-frame configuration; or
  determine the specific uplink-downlink sub-frame configuration based on previously received specific uplink-downlink sub-frame configuration information sent by the network side equipment via a high-layer signaling; or
  determine an uplink-downlink sub-frame configuration corresponding to previously received uplink-downlink sub-frame configuration information sent by the network side equipment via system broadcasting as the specific uplink-downlink sub-frame configuration; or
  determine a reference uplink-downlink sub-frame configuration configured to determine a downlink hybrid automatic repeat request (DL HARQ) timing or an uplink hybrid automatic repeat request (UL HARQ) timing as the specific uplink-downlink sub-frame configuration.

4. The user equipment according to claim 3, wherein the communication module is configured to communicate with the network side equipment during the current uplink-downlink sub-frame reconfiguration period in a manner which comprises a part or all of the following:
  communicating with the network side equipment during the current uplink-downlink sub-frame reconfiguration period based on the specific uplink-downlink sub-frame configuration in a manner that the specific uplink-downlink sub-frame configuration is configured to determine an uplink sub-frame and/or a downlink sub-frame during the current uplink-downlink sub-frame reconfiguration period;
  communicating with the network side equipment during the current uplink-downlink sub-frame reconfiguration period based on the specific uplink-downlink sub-frame configuration in a manner that the specific uplink-downlink sub-frame configuration is configured to determine a sub-frame for blind-detecting a physical downlink control channel (PDCCH) and/or an enhanced physical downlink control channel (E-PDCCH);
  communicating with the network side equipment during the current uplink-downlink sub-frame reconfiguration period based on the specific uplink-downlink sub-frame configuration in a manner that the specific uplink-downlink sub-frame configuration is configured to determine the downlink hybrid automatic repeat request timing;

communicating with the network side equipment during the current uplink-downlink sub-frame reconfiguration period based on the specific uplink-downlink sub-frame configuration in a manner that the specific uplink-downlink sub-frame configuration is configured to determine an uplink physical uplink shared channel (PUSCH) scheduling timing and the uplink hybrid automatic repeat request timing.

5. A user equipment comprising a processor and a data transceiver;

wherein the processor is configured to receive uplink-downlink sub-frame configuration information sent by a network side equipment during a current uplink-downlink sub-frame reconfiguration period; determine a specific uplink-downlink sub-frame configuration when the uplink-downlink sub-frame configuration information is not received during the current uplink-downlink sub-frame reconfiguration period; and communicate with the network side equipment during the current uplink-downlink sub-frame reconfiguration period based on the specific uplink-downlink sub-frame configuration;

the data transceiver is configured to implement a data transmission between the processor and the network side equipment, wherein the processor is further configured to:

determine an uplink-downlink sub-frame configuration corresponding to last uplink-downlink sub-frame configuration information received successfully by the user equipment as the specific uplink-downlink sub-frame configuration; or select an uplink-downlink sub-frame configuration with the most downlink sub-frames or uplink sub-frames from all alternative uplink-downlink sub-frame configurations as the specific uplink-downlink sub-frame configuration; or determine the specific uplink-downlink sub-frame configuration based on previously received specific uplink-downlink sub-frame configuration information sent by the network side equipment via a high-layer signaling; or determine an uplink-downlink sub-frame configuration corresponding to previously received uplink-downlink sub-frame configuration information sent by the network side equipment via system broadcasting as the specific uplink-downlink sub-frame configuration; or determine a reference uplink-downlink sub-frame configuration configured to determine a downlink hybrid automatic repeat request (DL HARQ) timing or an uplink hybrid automatic repeat request (UL HARQ) timing as the specific uplink-downlink sub-frame configuration.

6. The user equipment according to claim 5, wherein the processor is configured to communicate with the network side equipment during the current uplink-downlink sub-frame reconfiguration period in a manner which comprises a part or all of the following:

communicating with the network side equipment during the current uplink-downlink sub-frame reconfiguration period based on the specific uplink-downlink sub-frame configuration in a manner that the specific uplink-downlink sub-frame configuration is configured to determine an uplink sub-frame and/or a downlink sub-frame during the current uplink-downlink sub-frame reconfiguration period;

communicating with the network side equipment during the current uplink-downlink sub-frame reconfiguration period based on the specific uplink-downlink sub-frame configuration in a manner that the specific uplink-downlink sub-frame configuration is configured to determine a sub-frame for blind-detecting a physical downlink control channel (PDCCH) and/or an enhanced physical downlink control channel (E-PDCCH);

communicating with the network side equipment during the current uplink-downlink sub-frame reconfiguration period based on the specific uplink-downlink sub-frame configuration in a manner that the specific uplink-downlink sub-frame configuration is configured to determine the downlink hybrid automatic repeat request timing;

communicating with the network side equipment during the current uplink-downlink sub-frame reconfiguration period based on the specific uplink-downlink sub-frame configuration in a manner that the specific uplink-downlink sub-frame configuration is configured to determine an uplink physical uplink shared channel (PUSCH) scheduling timing and the uplink hybrid automatic repeat request timing.

* * * * *